United States Patent
Ueda et al.

(10) Patent No.: US 7,767,732 B2
(45) Date of Patent: Aug. 3, 2010

(54) FLAME-RETARDANT BIODEGRADABLE POLYESTER RESIN COMPOSITION, PRODUCTION METHOD THEREFOR, AND PRODUCT MOLDED/FORMED THEREFROM

(75) Inventors: Kazue Ueda, Uji (JP); Yoshio Okabayashi, Uji (JP)

(73) Assignee: Unitika Ltd., Hyogo (JP)

( * ) Notice: Subject to any disclaimer, the term of this patent is extended or adjusted under 35 U.S.C. 154(b) by 553 days.

(21) Appl. No.: 11/667,804

(22) PCT Filed: Aug. 26, 2005

(86) PCT No.: PCT/JP2005/015535

§ 371 (c)(1),
(2), (4) Date: May 14, 2007

(87) PCT Pub. No.: WO2006/051640

PCT Pub. Date: May 18, 2006

(65) Prior Publication Data

US 2008/0108729 A1 May 8, 2008

(30) Foreign Application Priority Data

Nov. 15, 2004 (JP) .............................. 2004-329896

(51) Int. Cl.
*C08K 5/10* (2006.01)
*C08K 3/22* (2006.01)
*C08K 3/10* (2006.01)

(52) U.S. Cl. .................. 523/124; 524/315; 524/430; 524/437

(58) Field of Classification Search ................ 523/124; 524/315, 430, 437
See application file for complete search history.

(56) References Cited

U.S. PATENT DOCUMENTS 7,449,510 B2 * 11/2008 Ueda et al. .................. 524/442

FOREIGN PATENT DOCUMENTS

| JP | 2004-190025 | 7/2004 |
| WO | 00/59996 | 10/2000 |
| WO | 2005/032456 | 4/2005 |

* cited by examiner

*Primary Examiner*—Kriellion A Sanders
(74) *Attorney, Agent, or Firm*—Fildes & Outland, P.C.

(57) ABSTRACT

A flame-retardant biodegradable polyester resin composition which comprises 100 parts by mass of a biodegradable polyester resin, 0.01 to 20 parts by mass of a (meth)acrylate compound, and 20 to 200 parts by mass of a metal oxide and/or a metal hydroxide.

9 Claims, 1 Drawing Sheet

FLAME-RETARDANT BIODEGRADABLE POLYESTER RESIN COMPOSITION, PRODUCTION METHOD THEREFOR, AND PRODUCT MOLDED/FORMED THEREFROM

TECHNICAL FIELD

The present invention relates to a flame-retardant biodegradable polyester resin composition, a production method therefor, and a product molded/formed therefrom.

BACKGROUND ART

Various studies are conducted on polylactic acids as biomass resins, and an attempt is made to find applications of the polylactic acids in a variety of fields. Particularly in the field of injection molding in which such a conventional polylactic acid is difficult to employ because of its lower crystallization rate, a polylactic acid excellent in heat resistance and moldability and having a higher crystallinity has been developed. As a result, the polylactic acid finds applications in a variety of fields, and an attempt has been made to employ the polylactic acid, for example, for household electric appliances and automotive components for which application of the polylactic acid was conventionally impossible.

Where the polylactic acid is employed for the household electric appliances and the automotive components, it is imperative to impart the polylactic acid with flame resistance. Halogen compounds and phosphorus compounds, which are highly effective for other resins, are known to be effective to impart a biodegradable resin with flame resistance. However, use of these compounds is not advantageous in consideration of environmental issues, toxicity and adverse effects on electronic devices, and alternative methods for the impartation of the flame resistance have been contemplated. For example, JP-A-8-252823, JP-A-2000-319532 and JP-A-2003-192925 disclose addition of a great amount of a metal hydroxide, use of a specific compound compatibilized with silicon oxide, and addition of a highly pure hydroxide compound or phosphorus compound, respectively, for the impartation of the flame resistance. Although a resin composition is imparted with flame resistance by the addition of a great amount of any of these inorganic compounds, the properties of the resin composition are significantly reduced, resulting in insufficient strength. In addition, the crystallization of the resin is not satisfactorily promoted, so that the resulting resin composition is poor in heat resistance. Further, JP-A-2004-190025 discloses that a flame-retardant polylactic acid excellent in heat resistance is provided by addition of a crystal nucleus agent as well as any of the aforementioned flame retarders. However, the disclosed crystal nucleus agent fails to sufficiently increase the crystallization rate, making it impossible to satisfactorily promote the crystallization of the resin during injection molding. Therefore, it is impossible to prepare a flame-retardant and heat-resistant resin excellent in moldability. In addition, the highly heat-resistant resin composition contains a great amount of a non-biodegradable organic compound and, hence, is less biodegradable.

DISCLOSURE OF THE INVENTION

Problems to be Solved by the Invention

To solve the aforementioned problems, it is an object of the present invention to provide a flame-retardant biodegradable polyester resin composition excellent in mechanical strength, heat resistance and moldability/formability, a production method therefor, and a product molded/formed therefrom.

Means for Solving the Problems

As a result of intensive studies conducted for solving the aforementioned problems, the inventors of the present invention found that a specific composition comprising a biodegradable polyester resin, a (meth)acrylate compound and a metal oxide and/or a metal hydroxide is flame-retardant and has proper moldability/formability, and a product molded/formed from the composition is excellent in heat resistance and mechanical strength. Thus, the present invention is attained.

The present invention has the following features:

(1) A flame-retardant biodegradable polyester resin composition comprising 100 parts by mass of a biodegradable polyester resin, 0.01 to 20 parts by mass of a (meth)acrylate compound, and 20 to 200 parts by mass of a metal oxide and/or a metal hydroxide;

(2) A production method for the flame-retardant biodegradable polyester resin composition (1), comprising melt-mixing a biodegradable polyester resin, a (meth)acrylate compound, a peroxide and a metal oxide and/or a metal hydroxide; and (3) A flame-retardant biodegradable resin product molded/formed from the flame-retardant biodegradable polyester resin composition (1).

EFFECTS OF THE INVENTION

According to the present invention, a flame-retardant biodegradable polyester resin composition excellent in mechanical strength and heat resistance and ensuring a satisfactory production efficiency is easily produced at lower costs, and a product is molded/formed from the resin with excellent moldability/formability.

BEST MODE FOR CARRYING OUT THE INVENTION

Figure 1:
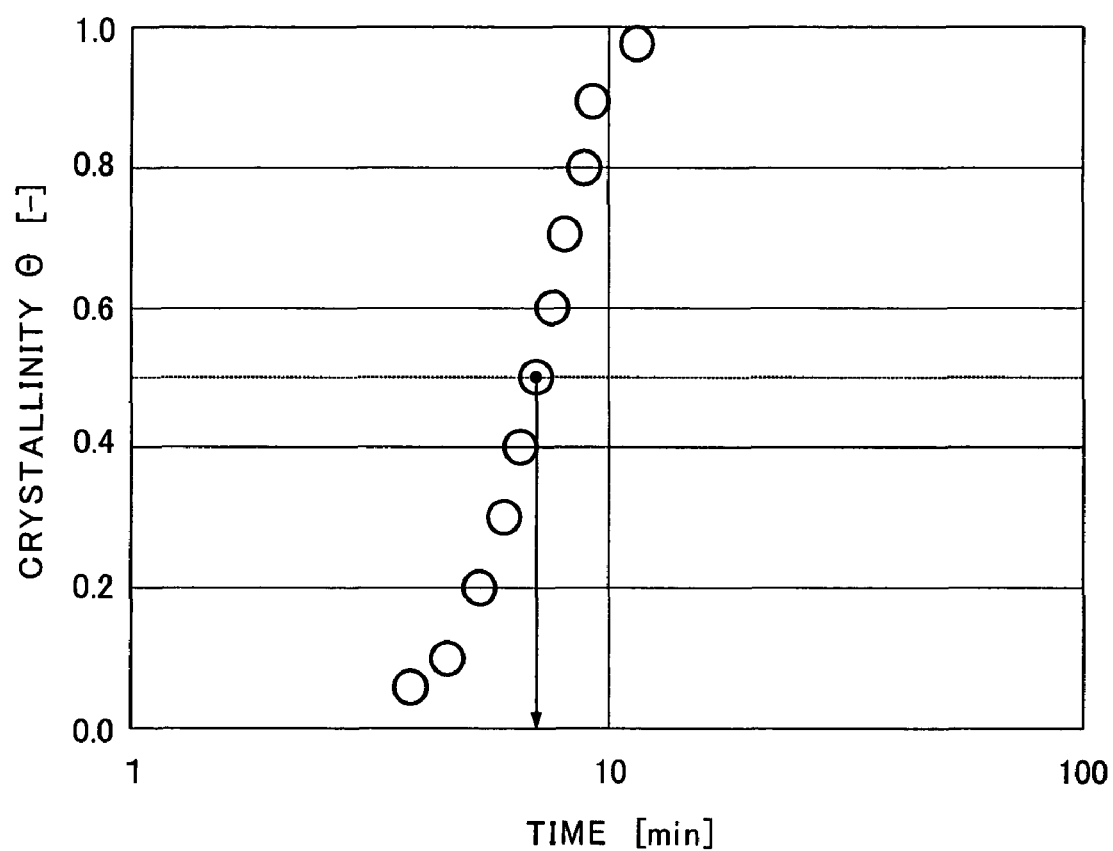
FIG. 1 is a diagram showing a relationship between the crystallinity ($\theta$) and the time, which is used for determining a crystallization rate index defined as the time (minute) required for the crystallinity ($\theta$) to reach one half the final crystallinity ($\theta$).

In the present invention, examples of a biodegradable polyester resin include poly($\alpha$- and/or $\beta$-hydroxycarboxylic acids), aliphatic polyesters prepared from a diol and a dicarboxylic acid, such as poly(ethylene succinate) and poly(butylene succinate), poly($\omega$-hydroxy acids) such as poly($\epsilon$-caprolactone), and poly(butylene succinate-co-butylene terephthalate) and poly(butylene adipate-co-butylene terephthalate) each containing an aromatic component and yet having biodegradability. Other examples include polyester amides, polyester carbonates, and polysaccharides such as starch. These may be used in the form of a mixture or a copolymer.

In the present invention, where the biodegradable polyester resin is a poly($\alpha$- and/or $\beta$-hydroxycarboxylic acid), an $\alpha$- and/or $\beta$-hydroxycarboxylic acid unit is preferably contained in a proportion of not less than 50 mol %. Examples of the $\alpha$- and/or $\beta$-hydroxycarboxylic acid unit include D-lactic acid, L-lactic acid, a mixture of D- and L-lactic acids, glycolic acid, 3-hydroxybutyric acid, 3-hydroxyvaleric acid and 3-hydroxycaproic acid. Particularly, a biodegradable polyester resin containing D-lactic acid, L-lactic acid or a mixture of D- and L-lactic acids is preferred because of its excellent mechanical strength and heat resistance. If the proportion of the α- and/or β-hydroxycarboxylic acid unit is less than 50 mol %, the biodegradability and the heat resistance are deteriorated. Therefore, the biodegradable polyester resin of the inventive biodegradable polyester resin composition preferably contains polylactic acid, polyglycolic acid, poly(3-hydroxybutyric acid), poly(3-hydroxyvaleric acid), poly(3-hydroxycaproic acid) or a copolymer or mixture of any of these polymers in a proportion of not less than 50 mol %.

The biodegradable polyester resin to be herein used is produced by employing a known melt-polymerization method and optionally in combination with a solid phase polymerization method. Further, poly(3-hydroxybutyric acid) and poly(3-hydroxyvaleric acid) may be microbiologically produced.

The molecular weight of the biodegradable polyester resin to be used in the present invention is not particularly limited, but the biodegradable polyester resin preferably has a weight-average molecular weight of not less than 50,000 and not greater than 1,000,000, more preferably not less than 100,000 and not greater than 1,000,000. If the weight-average molecular weight is less than 50,000, the resulting resin composition disadvantageously has an excessively low melt viscosity. On the other hand, if the weight-average molecular weight is greater than 1,000,000, the moldability of the resulting resin composition is disadvantageously steeply deteriorated.

In the present invention, the biodegradable polyester resin is preferably crosslinked, whereby the crystallization rate of the resin is increased to impart the resin composition with heat resistance. In the present invention, a (meth)acrylate compound and a peroxide to be described below are used as a crosslinking agent. The peroxide serves as a primary agent, while the (meth)acrylate compound serves as an auxiliary agent.

The (meth)acrylate compound to be used as the crosslinking agent for the biodegradable polyester resin in the present invention is preferably a compound having two or more (meth)acryl groups in its molecule or a compound having one or more (meth)acryl groups and one or more glycidyl groups or vinyl groups in its molecule, because these compounds are highly reactive with the biodegradable resin and hence their monomers are less likely to remain and color the resin. Specific examples of the compounds include glycidyl methacrylate, glycidyl acrylate, glycerol dimethacrylate, trimethylolpropane trimethacrylate, ethylene glycol dimethacrylate, diethylene glycol dimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycol dimethacrylate, polypropylene glycol diacrylate, polytetramethylene glycol dimethacrylate, and copolymers of any of these compounds having different lengths of alkylenes in alkylene, glycol portions thereof. Other examples include butanediol methacrylate and butanediol acrylate.

The (meth)acrylate compound is blended in a proportion of 0.01 to 20 parts by mass, preferably 0.05 to 10 parts by mass, based on 100 parts by mass of the biodegradable polyester resin. If the proportion is less than 0.01 part by mass, the resin is not sufficiently crosslinked, making it impossible to provide the effect of improving the mechanical strength, the heat resistance and the dimensional stability as intended by the present invention. If the proportion is greater than 20 parts by mass, the crosslinking degree is too high, resulting in poorer production efficiency.

In the present invention, the peroxide is employed for causing a crosslinking reaction of the biodegradable polyester resin as described above. However, the peroxide is decomposed during production of the inventive biodegradable polyester resin composition and, therefore, is not detected in the resin composition.

The peroxide to be herein used is preferably an organic peroxide having excellent dispersibility. Specific examples of the organic peroxide include benzoyl peroxide, bis(butylperoxy)trimethylcyclohexane, bis(butylperoxy)cyclododecane, butyl bis(butylperoxy)valerate, dicumyl peroxide, butyl peroxybenzoate, dibutyl peroxide, bis(butylperoxy)diisopropylbenzene, dimethyldi(butylperoxy)hexane, dimethyldi(butylperoxy)hexyne, and butylperoxycumene.

The amount of the peroxide to be blended with the ingredients for the production of the inventive resin composition is preferably 0.1 to 20 parts by mass, more preferably 0.1 to 10 parts by mass, based on 100 parts by mass of the biodegradable polyester resin. If the blend amount is less than 0.1 part by mass, it is impossible to provide the effect of improving the mechanical strength, the heat resistance and the dimensional stability as intended by the present invention. If the blend amount is greater than 20 parts by mass, the blended peroxide is partly unused. This is disadvantageous in terms of costs.

In the present invention, a metal oxide and/or a metal hydroxide are used as a flame retarder. These have smaller environmental loads and yet have satisfactory flame resistance. Examples of the metal oxide and the metal hydroxide to be herein used include magnesium hydroxide, aluminum hydroxide, calcium hydroxide, zinc hydroxide, potassium hydroxide, silicon hydroxide, titanium hydroxide, iron hydroxide, copper hydroxide, sodium hydroxide, nickel hydroxide, boron hydroxide, manganese hydroxide, lithium hydroxide, magnesium oxide, aluminum oxide, calcium oxide, zinc oxide, potassium oxide, silicon oxide, titanium oxide, iron oxide, copper oxide, sodium oxide, nickel oxide, boron oxide, manganese oxide and lithium oxide. Particularly, magnesium hydroxide, aluminum hydroxide and potassium hydroxide are preferred because they each have a higher hydroxyl group concentration per molecular weight and hence a higher flame-retardant effect and are lower in toxicity and costs.

The metal oxide and/or the metal hydroxide should be blended in a proportion of 20 to 200 parts by mass, preferably 25 to 150 parts by mass, based on 100 parts by mass of the biodegradable polyester resin. If the proportion is less than 20 parts by mass, it is impossible to provide the flame resistance as intended by the present invention. If the proportion is greater than 200 parts by mass, a product molded/formed from the resulting resin composition is poorer in mechanical properties.

The inventive biodegradable polyester resin composition preferably has a crystallization rate index of not greater than 50 (minutes) which is determined by melting the resin composition at 200° C. by means of a DSC machine and then crystallizing the resin composition at a predetermined constant temperature within a range of Tc±25° C. (wherein Tc is the crystallization temperature of the resin composition). The crystallization rate index is defined as the time (minute) required for the crystallinity of the resin composition to reach one half the final crystallinity when the resin composition is crystallized from a molten state between Tm+30° C. (wherein Tm is the melting point of the resin composition) and the predetermined temperature within the temperature range Tc±25° C. as shown in FIG. 1. A smaller crystallization rate index means a higher crystallization rate. If the crystallization rate is lower with a crystallization rate index of greater than 50 (minutes), too much time is required for the crystallization. Therefore, the resin composition cannot be molded into an intended shape, and the cycle time of the injection molding is prolonged, thereby reducing productivity. If the crystallization rate is too high, the moldability is deteriorated. Therefore, the lower limit of the crystallization rate index is preferably about 0.1 (minute).

Next, a production method for the inventive biodegradable polyester resin composition will be described. The inventive biodegradable polyester resin composition is produced by melt-kneading the biodegradable polyester resin, the (meth)acrylate compound, the peroxide and the metal oxide and/or the metal hydroxide by means of an ordinary extruder. A twin screw extruder is preferably used for properly kneading the resin composition. A kneading temperature preferably ranges from the melting point of the resin plus 5° C. to the melting point of the resin plus 100° C., and the kneading period is preferably 20 seconds to 30 minutes. If the kneading temperature is lower than the aforesaid range or the kneading period is shorter than the aforesaid range, the kneading and the reaction will be insufficient. If the kneading temperature is higher than the aforesaid range or the kneading period is longer than the aforesaid range, the resulting resin composition is liable to be decomposed and colored. Where the (meth)acrylate compound, the peroxide and the metal oxide and/or the metal hydroxide are solid, these are preferably dry-blended or supplied by means of a powder feeder. Where the (meth)acrylate compound and the peroxide are liquid, these are preferably injected into a middle portion of the extruder with the use of a pressure pump. In this case, the (meth)acrylate compound and the peroxide are preferably injected separately, because a mixture of the (meth)acrylate compound and the peroxide is poor in storage stability. Where the (meth)acrylate compound and the peroxide are injected together, the mixture is preferably diluted with a plasticizer or the like.

In order to provide a resin composition and a molded/formed product superior in physical properties in the present invention, it is preferred to inject the (meth)acrylate compound and the peroxide at a location closest to a material supplying port of the extruder, and supply the metal oxide and/or the metal hydroxide into the middle portion of the extruder by means of a feeder or the like. Thus, an unwanted reaction between the metal oxide and/or the metal hydroxide and the (meth)acrylate compound or the peroxide is suppressed, and these compounds are efficiently brought into contact with the biodegradable resin. Therefore, this production method is efficient.

A pigment, a heat stabilizer, an antioxidant, a weather resistant agent, a plasticizer, a lubricant, a mold release agent, an antistatic agent, a filler and the like may be added to the inventive biodegradable polyester resin composition, as long as the properties of the resin composition are not marred. Examples of the heat stabilizer and the antioxidant include hindered phenols, phosphorus compounds, hindered amines, sulfur compounds, copper compounds and halides of alkali metals, and mixtures of any of these compounds. Examples of the filler include inorganic fillers and organic fillers. Examples of the inorganic fillers include talc, calcium carbonate, zinc carbonate, warrastonite, silica, alumina, magnesium oxide, calcium silicate, sodium aluminate, calcium aluminate, sodium aluminosilicate, magnesium silicate, glass balloon, carbon black, zinc oxide, antimony trioxide, zeolites, hydrotalcite, metal fibers, metal whiskers, ceramic whiskers, potassium titanate, boron nitride, graphite, glass fibers and carbon fibers. Examples of the organic fillers include naturally existing polymers such as starch, cellulose particles, wood powder, bean curd refuse, chaff, wheat bran and kenaf, and products obtained by modifying any of these polymers. These may be used in the form of a nano-composite by addition of a phyllosilicate. A second thermoplastic resin may be added to the inventive biodegradable polyester resin composition.

Particularly for assisting the flame resistance, a flame retarder such as a condensed phosphate, polyphosphoric acid or a nitride compound may be added, as long as the biodegradability is not marred. The amount of any of the aforesaid additives to be added is preferably not greater than 10 parts by mass, more preferably not greater than 5 parts by mass, based on 100 parts by mass of the biodegradable polyester resin.

The method of mixing any of the aforesaid additives and the second thermoplastic resin in the inventive biodegradable polyester resin composition is not particularly limited. The mixing may be achieved, for example, by an ordinary thermal melting process followed by a kneading process with the use of a conventionally known kneader such as a single screw extruder, a twin screw extruder, a roll kneader or a Brabender kneader. Further, a static mixer or a dynamic mixer may be used in combination with the kneader for more efficient mixing. The additives and the second thermoplastic resin may be added to the biodegradable resin composition when the biodegradable resin is polymerized.

For improvement of the durability of the inventive resin composition, a hydrolysis preventing agent may be added to the resin composition. Examples of the hydrolysis preventing agent include carbodiimide, oxazolines and epoxy compounds. The amount of the hydrolysis preventing agent to be added is not particularly limited, but is preferably 0.1 to 5 parts by mass based on 100 parts by mass of the resin composition. The method of adding the hydrolysis preventing agent is to preliminarily dry-blend the hydrolysis preventing agent with the other ingredients when the ingredients are supplied into the extruder, or to supply the hydrolysis preventing agent through a supply port provided in the middle portion of the extruder.

The inventive resin composition is molded or formed into a variety of products by known molding/forming methods such as an injection molding method, a blow molding method and an extrusion method.

An ordinary injection molding method as well as a gas injection molding method and an injection press molding method may be employed as the injection molding method. A cylinder temperature for the injection molding should be not lower than the melting point (Tm) or the fluidization starting temperature of the resin composition, preferably in a range between the melting point (Tm) or the fluidization starting temperature plus 5° C. and the melting point (Tm) or the fluidization starting temperature plus 100° C., more preferably in a range between the melting point (Tm) or the fluidization starting temperature plus 5° C. and the melting point (Tm) or the fluidization starting temperature plus 50° C. If the molding temperature is too low, short molding will occur to result in unstable molding, and overload is liable to occur. On the other hand, if the molding temperature is too high, the biodegradable polyester resin will be decomposed and, therefore, the resulting molded product will have a reduced strength or be colored. The temperature of a mold is selected from the following temperatures according to an intended purpose: (i) a temperature not higher than the glass transition temperature Tg of the resin composition; and (ii), a temperature in a range of Tc±20° C., preferably in a range of Tc±10°

C. (wherein Tc is the crystallization temperature of the resin composition as mentioned above) if the resin composition is crystallized in the mold to impart the heat resistance. Where the mold temperature is set within a range of Tc±20° C., the molding is very advantageously carried out, because the resin is crystallized within the injection molding cycle for improvement of the heat resistance. Alternatively, a heat treatment may be performed after the resin composition is molded in a low-temperature mold kept at a temperature not higher than Tg. The crystallization rate of the inventive resin composition is very high, so that the time required for the heat treatment is relatively short. The temperature for the heat treatment is preferably within a range of Tc±20° C. This crystallization principle is applied to molding methods other than the injection molding method.

Examples of the blow molding method include a direct blowing method in which a product is molded directly from material chips, an injection blow molding method in which a preform (bottomed parison) prepared by injection molding is blow-molded, and a draw blow molding method. Further, a hot parison method in which a preform is blow-molded immediately after preparation of the preform, or a cold parison method in which a preform is once cooled and taken out and then reheated to be blow-molded may be employed. In the blow molding method, the temperature of a mold for the blowing molding is properly selected, so that the resin can be crystallized within the molding cycle for improvement of the heat resistance. Further, a heat treatment following the molding in a low-temperature mold kept at a temperature not higher than Tg improves the heat resistance.

A T-die method or a round die method may be employed for the extrusion method. A temperature for the extrusion should be not lower than the melting point (Tm) or the fluidization starting temperature of the resin composition, preferably in a range between the melting point (Tm) or the fluidization starting temperature plus 5° C. and the melting point (Tm) or the fluidization starting temperature plus 100° C., more preferably in a range between the melting point (Tm) or the fluidization starting temperature plus 5° C. and the melting point (Tm) or the fluidization starting temperature plus 50° C. If the extrusion temperature is too low, unstable extrusion will result, and overload is liable to occur. On the other hand, if the extrusion temperature is too high, the biodegradable resin composition will be decomposed and, therefore, the product produced by the extrusion is liable to have a reduced strength or be colored. Sheets, pipes and the like are produced by the extrusion method.

In the foregoing, the melting point (Tm) of the resin composition is measured in the same manner as in examples of the present invention to be described later. In contrast, the glass transition temperature (Tg) and the crystallization temperature (Tc) are measured in the following manner. With the use of a DSC machine (Pyrisl DSC available from Perkin Elmer Corporation), the temperature is increased at a rate of +20° C./min from 25° C. to Tm+30° C., and kept at Tm+30° C. for 10 minutes. Then, the temperature is reduced at a rate of −20° C./min from Tm+30° C. to −50° C., and kept at −50° C. for 5 minutes. The temperature is increased again at a rate of +20° C./min from −50° C. to Tm+30° C. for the second scanning. The glass transition temperature (Tg) is a value measured during the second scanning, and the crystallization temperature (Tc) is a value determined from an exothermic peak observed during the temperature reducing period in the aforesaid process.

The form of a product molded or formed by any of the aforesaid molding methods is not particularly limited. Specific examples of the molded product include: tableware such as dishes, bowls, pots, chopsticks, spoons, forks and knives; containers for fluids; container caps; stationery such as rulers, writing utensils, clear cases and CD cases; daily commodities such as sink corner strainers, trash boxes, washbowls, tooth brushes, combs and hangers; agricultural and horticultural materials such as flower pots and seeding pots; toys such as plastic models; electrical appliance resin components such as air conditioner panels and housings of personal computers and copiers; and automotive resin components such as bumpers, interior panels and door trims. The shapes of the fluid containers are not particularly limited, but the containers preferably each have a depth of not smaller than 20 mm for containing the fluids. The wall thicknesses of the containers are not particularly limited, but preferably not smaller than 0.1 mm, more preferably 0.1 to 5 mm, for strength. Specific examples of the fluid containers include: drinking cups and beverage bottles for milk beverages, cold beverages and alcoholic beverages; temporary storage containers for seasonings such as soy sauce, sauce, mayonnaise, ketchup and cooking oil; containers for shampoo and rinse; cosmetic containers; and agricultural containers.

Specific applications of sheets and pipes produced by the extrusion method include material sheets for deep drawing, material sheets for batch foaming, cards such as credit cards, desk pads, clear files, straws, agricultural and horticultural rigid pipes, personal computer components, automotive components and the like. Further, the sheets may be deep-drawn by vacuum forming, air pressure forming or vacuum air pressure forming for production of food containers, agricultural and horticultural containers, blister packages, press-through packages, personal computer components, automotive components and the like. A deep-drawing temperature and a heat treatment temperature are preferably (Tg+20° C.) to (Tg+100° C.). If the deep-drawing temperature is lower than (Tg+20° C.), the deep drawing is difficult. On the other hand, if the deep-drawing temperature is higher than (Tg+100° C.) the biodegradable resin will be decomposed or disoriented, resulting in uneven wall thickness or reducing the impact resistance. A product formed at Tc±20° C. is imparted with heat resistance during the forming. Further, a heat treatment following the forming in a low-temperature die kept at a temperature not higher than Tg improves the heat resistance.

The shapes of the food containers, the agricultural and horticultural containers, the blister packages, the press-through packages, container-like ones of the automotive components and container-like ones of the personal computer components are not particularly limited, but these deep-drawn containers preferably each have a depth of not smaller than 2 mm for containing food, goods, drugs and commodities. Further, the wall thicknesses of the containers are not particularly limited, but preferably not smaller than 50 μm, more preferably 150 to 500 μm, for strength. Specific examples of the food containers include fresh food trays, instant food containers, fast food containers and lunch boxes. Specific examples of the agricultural and horticultural containers include seeding pots Specific examples of the blister packages include food containers, and packages for various commodities including stationery, toys, dry batteries, automotive interior components and personal computer components.

Filaments can also be produced from the inventive resin composition. The production method for the filaments is not particularly limited, but a melt-spinning/drawing method is preferred. A melt-spinning temperature is preferably in a range between the melting point (Tm) or the fluidization starting temperature plus 5° C. and the melting point (Tm) or the fluidization starting temperature plus 100° C., more preferably in a range between the melting point (Tm) or the fluidization starting temperature plus 5° C. and the melting point (Tm) or the fluidization starting temperature plus 50° C. If the melt-spinning temperature is lower than the aforesaid lower limit, melt-extrusion tends to be difficult. On the other hand, if the melt-spinning temperature is higher than the aforesaid higher limit, remarkable decomposition will occur, making it difficult to provide highly strong filaments. The filaments produced by the melt-spinning may be drawn to an intended filament diameter at a temperature not lower than Tg. The draw ratio is preferably about 1 to about 20. The resulting filaments may be processed into various types of filaments such as multi-filaments and mono-filaments. In this case, the drawing and the subsequent heat treatment easily cause the crystallization, thereby improving the heat resistance.

The filaments produced by the aforesaid method are used for fibers and filaments for garments and industrial materials. Exemplary applications of the multi-filaments include various types of garment fibers, filaments for ropes and nets, filaments and fibers for industrial applications such as reinforcement filaments for resins and rubbers to be used for personal computer components and automotive components, and filaments and fibers for flags and sign nets for advertising applications. Exemplary applications of the mono-filaments include various types of nets, racket strings, fish-lines and abrasive applications. The filaments are also applicable to composite materials composed of the filaments and a resin.

EXAMPLES

The present invention will hereinafter be described more specifically by way of examples thereof. However, the invention is not limited to the following examples.

The following measurement methods were employed for evaluation of the following examples and comparative examples.

(1) Molecular Weight

The molecular weight was determined at 40° C. with the use of tetrahydrofuran or chloroform as an eluent by means of a gel permeation chromatography (GPC) device (available from Shimadzu Co., Ltd.) having a differential refractometer, and expressed on the basis of polystyrene calibration standards. Where a resin is less soluble in tetrahydrofuran, a sample was prepared by dissolving the resin in a small amount of chloroform and adding tetrahydrofuran to the resulting resin solution.

(2) Melting Point (Tm)

With the use of a DSC device (Pyrisl DSC available from Perkin Elmer Corporation), a sample was heated at a rate of +20° C./min from 25° C. to 250° C. Then, the sample was kept at 250° C. for 10 minutes, and cooled at a rate of −20° C./min from 250° C. to −50° C. Thereafter, the sample was kept at −50° C. for 5 minutes, and heated again at a rate of +20° C./min from −50° C. to 250° C. for second scanning. The melting point was determined from an exothermic peak observed during the second scanning.

(3) Flexural Modulus and Flexural Strength

In conformity with ASTM-D-790, a test strip having a size of 127 mm×12.7 mm×3.2 mm was prepared, and the flexural modulus and the flexural strength were measured with a load being applied to the test strip at a deformation rate of 1 mm/min.

(4) DTUL (Thermal Deflection Temperature)

In conformity with ASTM-D-648, the thermal deflection temperature was measured with a load of 0.45 MPa.

(5) Impact Strength

In conformity with ASTM-D-256, a test strip having a size of 64 mm×12.7 mm×3.2 mm with a notch was prepared, and the Izod impact strength was measured.

(6) Flame Resistance

The combustibility of a test strip molded by the injection molding method as having a length of 127 mm, a width of 12.7 mm and a thickness of 0.8 mm was evaluated in conformity with a vertical combustion test method specified by the Underwriters Laboratories Standards UL-94. More specifically, the test strip was vertically held, and a burner flame was kept in contact with a lower end of the test strip for 10 seconds and then removed. Then, the time required for extinction of the ignited test strip was measured. Immediately after the extinction, the burner flame was kept in contact with the test strip for 10 seconds for the second time. Then, the time required for extinction of the ignited test strip was measured in the same manner as in the first extinction. At the same time, it was checked whether or not a cotton wad placed below the test strip was ignited by fire falling from the test strip.

Based on the first and second combustion periods and the ignition of the cotton wad, the combustion degree was rated in conformity with the aforementioned UL-94. The rank of the flame resistance was rated in conformity with the vertical combustion test method specified by the UL-94. In the rating, V-0 is defined as the highest level of the flame resistance, and V-1 and V-2 are defined as progressively lower levels. A test strip in which the combustion reached a clamp portion thereof was rated substandard.

(7) Crystallization Rate Index (See FIG. 1)

With the use of a DSC device (Pyrisl DSC available from Perkin Elmer Corporation), a sample was heated at a rate of +500° C./min from 20° C. to Tm+30° C., and kept at Tm+30° C. for 5 minutes. Then, the sample was cooled at a rate of −500° C./min from Tm+30° C. to a predetermined temperature within a range of Tc±25° C., and kept at the predetermined temperature for crystallization. With the final crystallinity defined as 1, the time required for the crystallinity to reach 0.5 was determined as the crystallization rate index (minute).

More specifically, the predetermined temperature within a range of Tc±25° C. was 130° C. in the case of polylactic acid, and 90° C. in the case of polybutylene succinate.

(8) Durability

A test was performed by storing a test strip under constant temperature and constant humidity conditions at 60° C. at 95% RH for 500 hours. A test strip having a flexural strength of not less than 90% with respect to the initial flexural strength after the test was rated excellent (◎) ,and a test sample having a flexural strength of not less than 50% and less than 90% was rated good (○). A test sample having a flexural strength of not less than 20% and less than 50% was rated inferior (Δ), and a test sample having a flexural strength of less than 20% was rated bad (X). The flexural strength was herein measured by applying a load to a test strip having a size of 127 mm×12.7 mm×3.2 mm at a deformation rate of 1 mm/min in conformity with ASTM-D-790.

(9) Moldability

Thickness unevenness due to strain occurring during injection molding was measured. As a result, a molded sample having a thickness unevenness of less than 0.01 mm was rated excellent (◎) ,and a molded sample having a thickness unevenness of not less than 0.01 mm and less than 0.1 mm was rated good (○). A molded sample deformed during demolding thereof or having a thickness unevenness of not less than 0.1 mm was rated bad (X)

The following ingredients were used in the following examples and comparative examples.

1. Biodegradable Polyester Resins (A) Polylactic Acids

PLA-A: Having a weight-average molecular weight of 190,000, an L-lactic acid content of 99 mol %, a D-lactic acid content of 1 mol %, a melting point of 168° C. and an MFR (melt flow rate) of 3 g/10 min (NATURE WORKS available from Cargill Dow Corporation)

PLA-B: Having a Weight-average Molecular Weight of 120,000, an L-lactic acid content of 99 mol %, a D-lactic acid content of 1 mol %, a melting point of 168° C. and an MFR of 20 g/10 min (NATURE WORKS available from Cargill Dow Corporation)

PLA-C: Having a weight-average molecular weight of 190,000, an L-lactic acid content of 96 mol %, a D-lactic acid content of 4 mol %, a melting point of 158° C. and an MFR of 4 g/10 min (NATURE WORKS available from Cargill Dow Corporation)

(B) Other Resin

PBSL: A polybutylene succinate resin (AZ-61TN available from Mitsubishi Chemical Corporation and having a weight-average molecular weight of 130,000 and amelting point of 110° C.)

2. (Meth)Acrylate Compounds

PEGDM: Polyethylene glycol dimethacrylate (available from Nippon Oil & Fats Co., Ltd.)

TMPTM: Trimethylol propane trimethacrylate (available from Nippon Oil & Fats Co., Ltd.)

DEGDM: Diethylene glycol dimethacrylate (available from Nippon Oil & Fats Co., Ltd.)

GM: Glycidyl methacrylate (available from Nippon Oil & Fats Co., Ltd.)

3. Peroxides

I: A solution obtained by dissolving di-t-butyl peroxide (available from Nippon Oil & Fats Co., Ltd.) to a concentration of 10% in acetyltributyl citrate as a plasticizer J: A solution obtained by dissolving 2,5-dimethyl-2,5-bis(t-butylperoxy)hexyne-3 (available from Nippon Oil & Fats Co., Ltd.) to a concentration of 10% in acetyltributyl citrate as a plasticizer K: Powder obtained by diluting 2,5-dimethyl-2,5-bis(t-butylperoxy)hexyne-3 with an inert solid diluent (available from Nippon Oil & Fats Co., Ltd.) and preliminarily dry-blended in a biodegradable polyester resin for use 4. Metal Oxides and/or Metal Hydroxides AL: Aluminum hydroxide MG: Magnesium hydroxide CA: Calcium hydroxide 5. Other Additives E: A carbodiimide terminal blocking agent (LA-1 available from Nisshinbo Industries Inc.)

N: A phosphate compound (PX-200 available from Daihachi Chemical Co., Ltd.)

M: Organically synthesized fluorinated mica (MEE available from Coop Chemical Co., Ltd.)

Example 1

First, 100 parts by mass of a polylactic acid (PLA-A) having a weight-average molecular weight of 190,000, an L-lactic acid content of 99 mol % and a D-lactic acid content of 1 mol % was supplied into a twin screw extruder (PCM-30 available from Ikegai Co., Ltd., having a die diameter of 4 mm×3 holes, an extrusion head temperature of 200° C. and a die outlet temperature of 180° C.). Then, 0.25 parts by mass of polyethylene glycol dimethacrylate (PEGDM) available from Nippon Oil & Fats Co., Ltd. and 0.5 parts by mass of di-t-butyl peroxide (I) available from Nippon Oil & Fats Co., Ltd. were injected into the kneader by means of a pump. 58 parts by mass of aluminum hydroxide as a metal hydroxide was dry-blended in the polylactic acid. Then, the resulting mixture was extruded and pelletized. Thus, a biodegradable polyester resin composition was prepared. The physical properties of the composition and the result of the molding test were shown in Table 1.

Table 1

TABLE 1

| | | Example | | | | | |
|---|---|---|---|---|---|---|---|
| | | 1 | 2 | 3 | 4 | 5 | 6 |
| Ingredients of biodegradable polyester resin composition | | | | | | | |
| Biodegradable polyester resin | | | | | | | |
| Type | | PLA-A | PLA-B | PLA-C | PLA-D | PLA-B | PLA-B |
| Parts by mass | | 100 | 100 | 100 | 100 | 100 | 100 |
| (Meth)acrylate compound | | | | | | | |
| Type | | DEGDM | PEGDM | PEGDM | TMPTM | DEGDM | GM |
| Parts by mass | | 0.25 | 0.25 | 0.25 | 0.25 | 0.25 | 0.25 |
| Peroxide | | | | | | | |
| Type | | I | I | I | I | I | I |
| Parts by mass | | 0.5 | 0.5 | 0.5 | 0.5 | 0.5 | 0.5 |
| Metal hydroxide | | | | | | | |
| Type | | AL | AL | AL | AL | AL | AL |
| Parts by mass | | 58 | 58 | 58 | 58 | 58 | 58 |
| Additive 1 | | | | | | | |
| Type | | — | — | — | — | — | — |
| Parts by mass | | — | — | — | — | — | — |
| Additive 2 | | | | | | | |
| Type | | — | — | — | — | — | — |
| Parts by mass | | — | — | — | — | — | — |

TABLE 1-continued

| | | | | | | |
|---|---|---|---|---|---|---|
| Physical properties of composition | | | | | | |
| Flexural modulus (GPa) | 6.0 | 5.9 | 5.9 | 6.0 | 6.1 | 6.0 |
| Flexural strength (MPa) | 92 | 89 | 88 | 90 | 93 | 88 |
| DTUL (0.45 MPa)(° C.) | 131 | 128 | 128 | 127 | 128 | 134 |
| Impact strength (J/m) | 24 | 25 | 25 | 24 | 23 | 24 |
| Flame resistance | V-0 | V-0 | V-0 | V-0 | V-0 | V-0 |
| Crystallization rate index (min) | 1.7 | 1.4 | 1.4 | 1.5 | 1.9 | 2.1 |
| Durability | ○ | ○ | ○ | ○ | ○ | ○ |
| Moldability | | | | | | |
| Injection molding | ○ | ○ | ○ | ○ | ○ | ○ |
| Blow molding | ○ | ○ | ○ | ○ | ○ | ○ |

| | Example | | | | | |
|---|---|---|---|---|---|---|
| | 7 | 8 | 9 | 10 | 11 | 12 |
| Ingredients of biodegradable polyester resin composition | | | | | | |
| Biodegradable polyester resin | | | | | | |
| Type | PLA-B | PLA-B | PLA-B | PLA-B | PLA-B | PLA-B |
| Parts by mass | 100 | 100 | 100 | 100 | 100 | 100 |
| (Meth)acrylate compound | | | | | | |
| Type | DEGDM | DEGDM | DEGDM | DEGDM | DEGDM | DEGDM |
| Parts by mass | 0.25 | 0.25 | 0.15 | 0.07 | 0.15 | 0.15 |
| Peroxide | | | | | | |
| Type | J | K | I | I | I | I |
| Parts by mass | 0.5 | 0.5 | 0.4 | 0.2 | 0.4 | 0.4 |
| Metal hydroxide | | | | | | |
| Type | AL | AL | AL | AL | AL | AL |
| Parts by mass | 58 | 58 | 58 | 58 | 40 | 100 |
| Additive 1 | | | | | | |
| Type | — | — | — | — | — | — |
| Parts by mass | — | — | — | — | — | — |
| Additive 2 | | | | | | |
| Type | — | — | — | — | — | — |
| Parts by mass | — | — | — | — | — | — |
| Physical properties of composition | | | | | | |
| Flexural modulus (GPa) | 6.2 | 6.4 | 5.7 | 5.5 | 5.0 | 7.3 |
| Flexural strength (MPa) | 87 | 89 | 86 | 85 | 89 | 83 |
| DTUL (0.45 MPa)(° C.) | 132 | 129 | 119 | 123 | 128 | 139 |
| Impact strength (J/m) | 23 | 25 | 22 | 21 | 26 | 20 |
| Flame resistance | V-0 | V-0 | V-0 | V-0 | V-2 | V-0 |
| Crystallization rate index (min) | 2.0 | 1.8 | 2.2 | 2.8 | 1.9 | 1.8 |
| Durability | ○ | ○ | ○ | ○ | ○ | ○ |
| Moldability | | | | | | |
| Injection molding | ○ | ○ | ○ | ○ | ○ | ○ |
| Blow molding | ○ | ○ | ○ | ○ | ○ | ○ |

| | Example | | | | | |
|---|---|---|---|---|---|---|
| | 13 | 14 | 15 | 16 | 17 | 18 |
| Ingredients of biodegradable polyester resin composition | | | | | | |
| Biodegradable polyester resin | | | | | | |
| Type | PLA-B | PLA-B | PLA-B | PLA-B | PLA-B | PLA-B |
| Parts by mass | 100 | 100 | 100 | 100 | 100 | 100 |
| (Meth)acrylate compound | | | | | | |
| Type | DEGDM | DEGDM | DEGDM | DEGDM | DEGDM | DEGDM |
| Parts by mass | 0.15 | 0.15 | 0.15 | 0.15 | 0.15 | 0.15 |
| Peroxide | | | | | | |
| Type | I | I | I | I | I | I |
| Parts by mass | 0.4 | 0.4 | 0.4 | 0.4 | 0.4 | 0.4 |
| Metal hydroxide | | | | | | |
| Type | AL | MG | CA | AL | AL | AL |
| Parts by mass | 180 | 58 | 58 | 58 | 58 | 58 |

TABLE 1-continued

|  | | | | | | |
|---|---|---|---|---|---|---|
| Additive 1 | | | | | | |
| Type | — | — | — | E | N | E |
| Parts by mass | — | — | — | 1 | 5 | 2 |
| Additive 2 | | | | | | |
| Type | — | — | — | — | — | N |
| Parts by mass | — | — | — | — | — | 10 |
| Physical properties of composition | | | | | | |
| Flexural modulus (GPa) | 8.7 | 6.4 | 6.3 | 6.2 | 5.8 | 5.4 |
| Flexural strength (MPa) | 80 | 85 | 87 | 82 | 85 | 81 |
| DTUL (0.45 MPa)(° C.) | 142 | 133 | 132 | 121 | 122 | 119 |
| Impact strength (J/m) | 19 | 23 | 24 | 22 | 24 | 25 |
| Flame resistance | V-0 | V-0 | V-0 | V-0 | V-0 | V-0 |
| Crystallization rate index (min) | 1.8 | 1.7 | 1.7 | 2.3 | 2.9 | 3.1 |
| Durability | ○ | ○ | ○ | ◎ | ○ | ◎ |
| Moldability | | | | | | |
| Injection molding | ○ | ○ | ○ | ○ | ○ | ○ |
| Blow molding | ○ | ○ | ○ | ○ | ○ | ○ |

|  | Example | | Comparative Example | | | |
|---|---|---|---|---|---|---|
|  | 19 | 20 | 1 | 2 | 3 | 4 |
| Ingredients of biodegradable polyester resin composition | | | | | | |
| Biodegradable polyester resin | | | | | | |
| Type | PLA-B | PBSL | PLA-B | PLA-B | PLA-B | PBSL |
| Parts by mass | 100 | 100 | 100 | 100 | 100 | 100 |
| (Meth)acrylate compound | | | | | | |
| Type | DEGDM | DEGDM | DEGDM | — | DEGDM | DEGDM |
| Parts by mass | 0.25 | 0.05 | 0.15 | — | 25 | 0.05 |
| Peroxide | | | | | | |
| Type | I | I | I | — | I | I |
| Parts by mass | 0.5 | 0.1 | 0.4 | — | 25 | 0.1 |
| Metal hydroxide | | | | | | |
| Type | AL | AL | — | AL | AL | — |
| Parts by mass | 58 | 58 | — | 58 | 58 | — |
| Additive 1 | | | | | | |
| Type | M | — | — | — | — | — |
| Parts by mass | 3 | — | — | — | — | — |
| Additive 2 | | | | | | |
| Type | — | — | — | — | — | — |
| Parts by mass | — | — | — | — | — | — |
| Physical properties of composition | | | | | | |
| Flexural modulus (GPa) | 7.0 | 0.8 | 4.2 | 6.8 | — | 0.5 |
| Flexural strength (MPa) | 93 | 53 | 102 | 90 | — | 42 |
| DTUL (0.45 MPa)(° C.) | 145 | 89 | 108 | 61 | — | 85 |
| Impact strength (J/m) | 23 | 45 | 27 | 23 | — | 49 |
| Flame resistance | V-1 | V-0 | Sub-standard | V-2 | — | Sub-standard |
| Crystallization rate index (min) | 1.3 | 2.1 | 1.4 | 34.5 | — | 2.2 |
| Durability | ○ | ○ | ○ | ○ | — | ○ |
| Moldability | | | | | | |
| Injection molding | ○ | ○ | ○ | X | X | ○ |
| Blow molding | ○ | ○ | ○ | Δ | X | ○ |

Examples 2 to 7, 9 to 19 and Comparative Examples 1 to 3

Compositions were prepared in substantially the same manner as in Example 1, except that different types of biodegradable polyester resins, (meth)acrylate compounds, peroxides, metal oxides and/or metal hydroxides and additives were blended in different amounts as shown in Table 1. The molding test was performed by using the resulting compositions. The results are shown in Table 1.

Example 8

A composition was prepared in substantially the same manner as in Example 1, except that a biodegradable polyester resin, a (meth)acrylate compound, a peroxide, a metal oxide and/or a metal hydroxide and additives were employed in amounts as shown in Table 1 and these ingredients were dry-blended and supplied into an extruder. The molding test was performed by using the resulting composition. The results are shown in Table 1.

Examples 20 and Comparative Example 4

Compositions were prepared in substantially the same manner as in Example 1, except that PBSL was used as the biodegradable polyester resin and the other ingredients were employed in amounts as shown in Table 1. The molding test was performed by using the resulting composition. The results are shown in Table 1.

As apparent from Table 1, the flame-retardant resin compositions and the flame-retardant molded products of Examples 1 to 19 were each excellent in strength and moldability with a DTUL of not less than 110° C.

Particularly, the flame-retardant resin compositions and the flame-retardant molded products of Examples 1 to 10 were each excellent in strength and moldability with a DTUL of not less than 110° C., though the different types of biodegradable polyester resins were employed in Examples 1 to 3 and the different types and different amounts of (meth)acrylate compounds were employed in Examples 4 to 10.

The flame-retardant resin compositions and the flame-retardant molded products of Examples 11 to 15 were each excellent in strength and moldability with a DTUL of not less than 110° C., though the different types and different amounts of metal oxides and/or metal hydroxides were employed.

In Examples 16 to 19, the terminal blocking agent, the phosphate compound and the phyllosilicate were employed as the other additives. The flame-retardant resin compositions and the flame-retardant molded products of Examples 16 to 19 were excellent in strength and moldability with a DTUL of not less than 110° C.

In Example 20, PBSL was employed instead of the polylactic acids employed in Examples 1 to 19. Therefore, Example 20 was slightly inferior in flexural modulus, flexural strength and DTUL, but superior in impact resistance and comparable in flame resistance, crystallization rate, durability and moldability to Examples 1 to 19.

Comparative Example 1 employed neither a metal oxide nor a metal hydroxide, thereby failing to impart flame resistance. The composition of Comparative Example 2 was imparted with flame resistance. However, the composition of Comparative Example 2, which contained no (meth)acrylate compound, had a lower crystallization rate and was poor in heat resistance and injection moldability.

Comparative Example 3 employed excessively great amounts of the (meth) acrylate compound and the peroxide. Therefore, the resin was excessively crosslinked to result in clogging in the extruder, thereby failing to provide a resin composition.

Comparative Example 4 employed neither a metal or a metal hydroxide as compared with example 20, failing to impart flame resistance.

What is claimed is:

1. A flame-retardant biodegradable polyester resin composition comprising:
   100 parts by mass of a biodegradable polyester resin;
   0.01 to 20 parts by mass of a (meth)acrylate compound; and
   20 to 200 parts by mass of a metal hydroxide.

2. A flame-retardant biodegradable polyester resin composition as set forth in claim 1, wherein the (meth)acrylate compound is a compound having two or more (meth)acryl groups in its molecule or a compound having one or more (meth)acryl groups and one or more glycidyl groups or vinyl groups in its molecule.

3. A flame-retardant biodegradable polyester resin composition as set forth in claim 1, wherein the biodegradable polyester resin contains not less than 50 mol % of an α- and/or β-hydroxycarboxylic acid unit.

4. A flame-retardant biodegradable polyester resin composition as set forth in claim 3, wherein the α- and/or β-hydroxycarboxylic acid unit is D-lactic acid, L-lactic acid or a mixture of D- and L-lactic acids.

5. A flame-retardant biodegradable polyester resin composition as set forth in claim 1, wherein a crystallization rate index is not greater than 50 (min).

6. A production method for a flame-retardant biodegradable polyester resin composition as recited in claim 1, the method comprising melt-mixing a biodegradable polyester resin, a (meth)acrylate compound, a peroxide, and a metal hydroxide.

7. A production method for a flame-retardant biodegradable polyester resin composition as set forth in claim 6, wherein the peroxide is used in an amount of 0.1 to 20 parts by mass based on 100 parts by mass of the biodegradable polyester resin.

8. A production method for a flame-retardant biodegradable polyester resin composition as set forth in claim 6, wherein an organic peroxide is used as the peroxide.

9. A flame-retardant biodegradable resin product molded/formed from a flame-retardant biodegradable polyester resin composition as recited in claim 1.

* * * * *